(12) United States Patent
Hosoyamada (10) Patent No.: US 6,414,740 B1
(45) Date of Patent: Jul. 2, 2002

(54) LCD HAVING TEMPERATURE DETECTION ELEMENTS PROVIDED ON AN ACTIVE-SUBSTRATE

(75) Inventor: Shunichi Hosoyamada, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/583,730

(22) Filed: May 31, 2000

(30) Foreign Application Priority Data

Jun. 1, 1999 (JP) .......................................... 11-153738

(51) Int. Cl.[7] ........................ G02F 1/1333; G02F 1/133
(52) U.S. Cl. ......................................... 349/161; 349/34
(58) Field of Search ........................... 349/161, 20, 21, 349/22

(56) References Cited

U.S. PATENT DOCUMENTS

| 6,072,459 A | * | 6/2000 | Asakawa et al. | ............ | 349/161 |
| 6,163,360 A | * | 12/2000 | Tanaka et al. | ............... | 349/172 |

FOREIGN PATENT DOCUMENTS

| JP | 58-176622 | 10/1983 |
| JP | 64-6927 | 1/1989 |
| JP | 1-58490 | 12/1989 |
| JP | 2-275924 | 11/1990 |
| JP | 4-34519 | 2/1992 |
| JP | 6-138843 | 5/1994 |
| JP | 8-029265 | 2/1996 |
| JP | 8-076096 | 3/1996 |
| JP | 9-005710 | 1/1997 |
| JP | 9-146072 | 6/1997 |
| JP | 10-123498 | 5/1998 |
| JP | 11-7001 | 1/1999 |

OTHER PUBLICATIONS

Japanese Utility Model Application S62–163299 (Japanese Unexamined Utility Model Application Publication H1–67689) Microfilm.
Japanese Utility Model Application H3–2003 (Japanese Unexamined Utility Model Application Publication H4–107234) Microfilm.

* cited by examiner

*Primary Examiner*—Toan Ton
(74) *Attorney, Agent, or Firm*—Foley & Lardner (57) ABSTRACT

In a black mask light blocking region within a liquid-crystal display panel formed by a TFT substrate, a color filter substrate, and a liquid-crystal layer disposed in a space between the TFT substrate and the color filter substrate, a temperature detection element is formed, simultaneously with process step that forms a switching element such as a thin-film transistor on the TFT substrate, thereby enabling detection of the temperature of the liquid-crystal layer without the influence of outside air or the like.

9 Claims, 9 Drawing Sheets

PRIOR ART

Fig. 9

PRIOR ART

LCD HAVING TEMPERATURE DETECTION ELEMENTS PROVIDED ON AN ACTIVE-SUBSTRATE

BACKGROUND OF THE INVENTION

1. Field of the Invention

The present invention relates to a liquid-crystal display apparatus and a method for manufacturing a liquid-crystal display, and more particularly to temperature detection technology used in a liquid-crystal display apparatus that employs active matrix.

2. Background of the Invention

Figure 8:
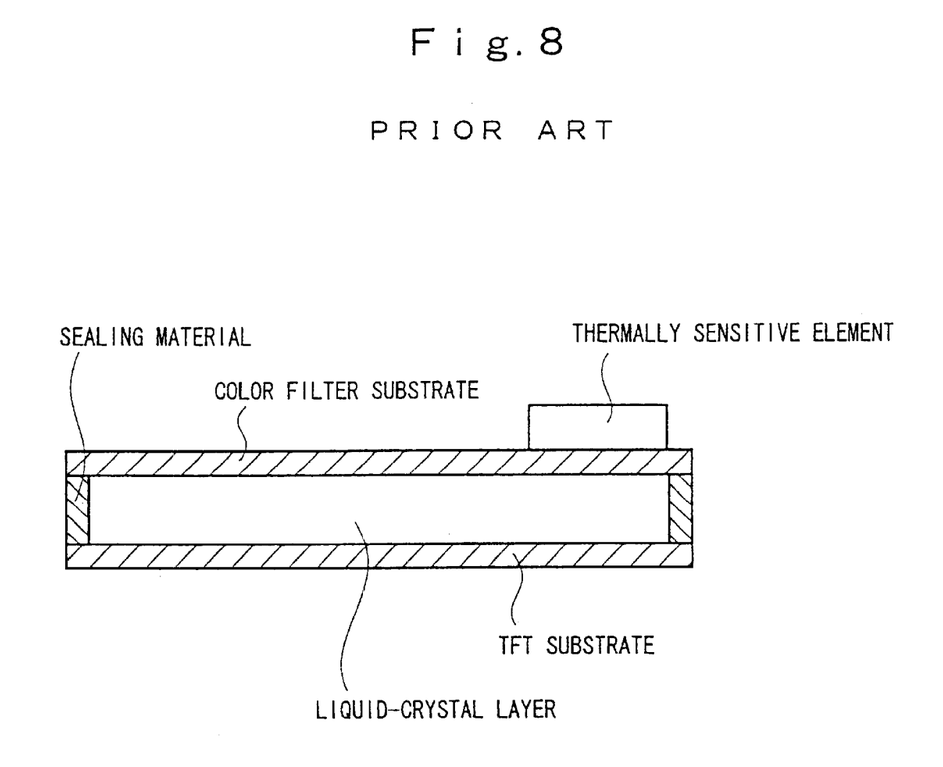
FIG. 8 is a cross-section view showing a liquid-crystal display panel according to the prior art.
Figure 9:
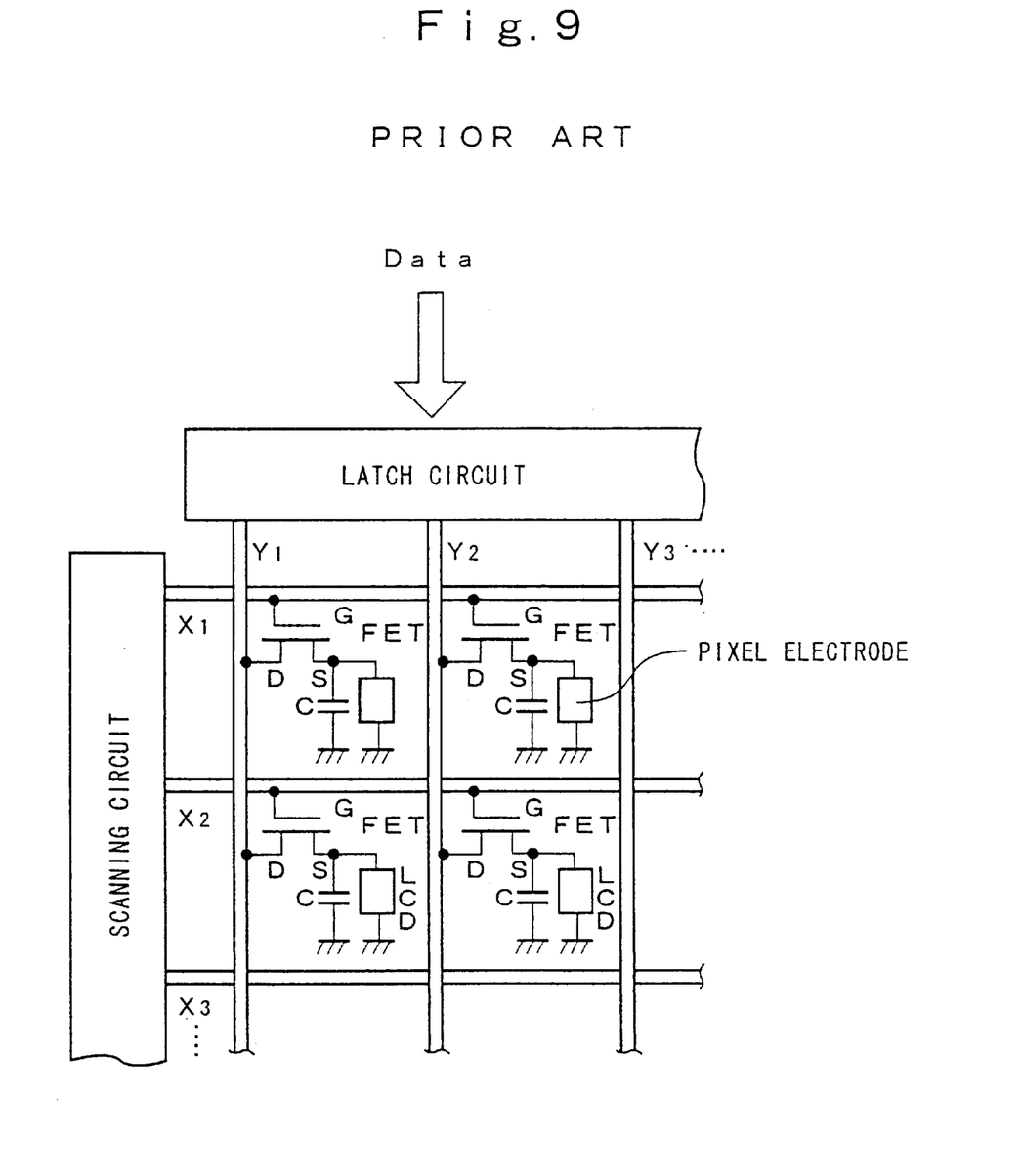
FIG. 9 is a circuit diagram showing a liquid-crystal display employing an active matrix in the prior art.

In the past, technology for this type of temperature detection circuit is known from the disclosure of the Japanese Unexamined Patent Publication (KOKAI) No. 60-107023. Specifically, as shown in FIG. 8, the above-mentioned technology is that a temperature is detected by means of a thermally sensitive element attached by adhesion or the like to an outside surface of a TFT substrate or color filter substrate, the consumed power being minimized, by a subsequent temperature control circuit, based on the detected temperature. However, There are many problems as follows.

The first problem is that it is not possible to detect the temperature of a liquid-crystal layer with accuracy. The reason for this is that, in prior art, the construction was such that the thermally sensitive element was attached by adhering to an outside surface of a substrate in a protruding condition, so that supporting members to fix the liquid crystal display panel and thermally sensitive element thereon and TFT substrate and color filter substrate serve as heat radiators.

That is, in the above-noted prior art, because the thermally sensitive element detects a temperature of the liquid-crystal layer in an environment in which the thermally sensitive element was exposed to the outside air on an outside surface of a TFT substrate or color filter substrate, the obtained result was different from the temperature within the liquid-crystal layer, a temperature of thermal equilibrium between the outside air and the TFT or color filter substrate to which the thermally sensitive element is attached, is detected. Because the above-mentioned temperature is different from the temperature of the liquid crystal layer that is sealed within these two substrates, it is not possible to accurately transmit the temperature of the liquid-crystal layer itself to a temperature compensation circuit that optimizes a drive signal that is applied to the liquid-crystal layer in response to temperature changes with respect to the surrounding environment.

The second problem accompanying the prior art was that, because of an increase in the number of components and the number of assembly steps, there was an increase in cost. The reason for this is that the parts and materials such as the thermally sensitive element and adhesive for adhering, the wiring for transmitting the temperature control signal to the external temperature control circuit and the time required for curing of the adhesive, and the number of structural parts and assembly steps for providing an escape so that the thermally sensitive element does not come into contact with the housing that protects and supports the liquid-crystal panel, increase, thereby causing an increase in the cost.

Accordingly, it is an object of the present invention to accurately detect the temperature of a liquid-crystal layer in a liquid-crystal display panel, and achieve proper temperature compensation in response to temperature changes.

It is another object of the present invention to reduce the number of components in a liquid-crystal display panel and assembly steps, and achieve a reduction in size and weight of a liquid-crystal display panel.

Yet another object of the present invention is to achieve a simplification of the circuit and configuration of a liquid-crystal display panel.

Yet another object of the present invention is to reduce the number of components and assembly steps for a liquid-crystal display panel, and to achieve an improvement in productivity thereof.

Yet another object of the present invention is to accurately detect the temperature of a liquid-crystal display panel, and to perform appropriate temperature compensation in response to a temperature change, thereby achieving an improvement in display performance.

SUMMARY OF THE INVENTION

In order to achieve the above-noted object, the present invention has the following technical constitution.

A first aspect of the present invention is a liquid-crystal display apparatus comprising a liquid-crystal display panel having a first substrate on which a plurality of scannig lines and a plurality of signal lines are disposed perpendicularly, and on which a plurality of pixel electrodes are provided so as to be connected to intersections between the scannig lines and the signal lines via a switching element, respectively, a second substrate disposed in opposition to the first substrate, and a liquid-crystal layer sandwiched between the first substrate and the second substrate; wherein a temperature detection element for detecting a temperature within the liquid-crystal layer is provided on the first substrate, the temperature detection element is provided in a light-blocking region formed in an outer periphery of a display region of the liquid-crystal display panel.

In the second aspect of the present invention, the switching element is a thin-film transistor, and the temperature detection element is a thin-film transistor.

In the third aspect of the present invention, the switching element is a thin-film transistor, and the temperature detection element is a thin-film diode or a thin-film constant-voltage diode.

In the fourth aspect of the present invention, a semiconductor layer of the switching element and the temperature detection element is made of amorphous silicon.

In the fifth aspect of the present invention, a liquid crystal driving circuit connected to the signal lines, is provided, and an output terminal of the temperature detection element is coupled to a wiring on a tape carrier package on which the liquid crystal driving circuit is provided.

A sixth aspect of the present invention is a method of manufacturing a liquid-crystal display apparatus comprising a first substrate having a switching element to control a pixel electrode, a second substrate disposed in opposition to the first substrate, and a liquid-crystal layer sandwiched between the first substrate and the second substrate, wherein in a step of forming the switching element on the first substrate, a temperature detection element that detects a temperature of the liquid-crystal layer is formed on the same surface of the first substrate as the switching element is provided.

In a seventh aspect of the present invention, the temperature detection element formed on the first substrate is a thin-film transistor.

In a eighth aspect of the present invention, the temperature detection element formed on the first substrate is a thin-film diode.

More specifically, in the present invention, a temperature detection element formed by a thin-film transistor or thin-film diode on a light-blocking black mask part of a liquid-crystal display panel is formed simultaneously in the process step that forms the thin-film transistor or thin-film diode for driving the liquid crystal pixels, and an unused output terminal of the TCP common electrode voltage supplying terminals on the tape carrier package is used as a lead wire for the temperature detection element. This temperature detection element performs detection of the temperature by utilizing the characteristic of an increase in the drain current in proportion to the temperature of the liquid-crystal layer that changes with a change in the environmental temperature. Therefore, it is possible using a simple configuration to accurately detect the temperature of the liquid-crystal layer that changes with a change in the environmental temperature.

DETAILED DESCRIPTION OF THE PREFERRED EMBODIMENTS

Embodiments of the present invention are described in detail below, with reference made to relevant accompanying drawings.

Figure 5:
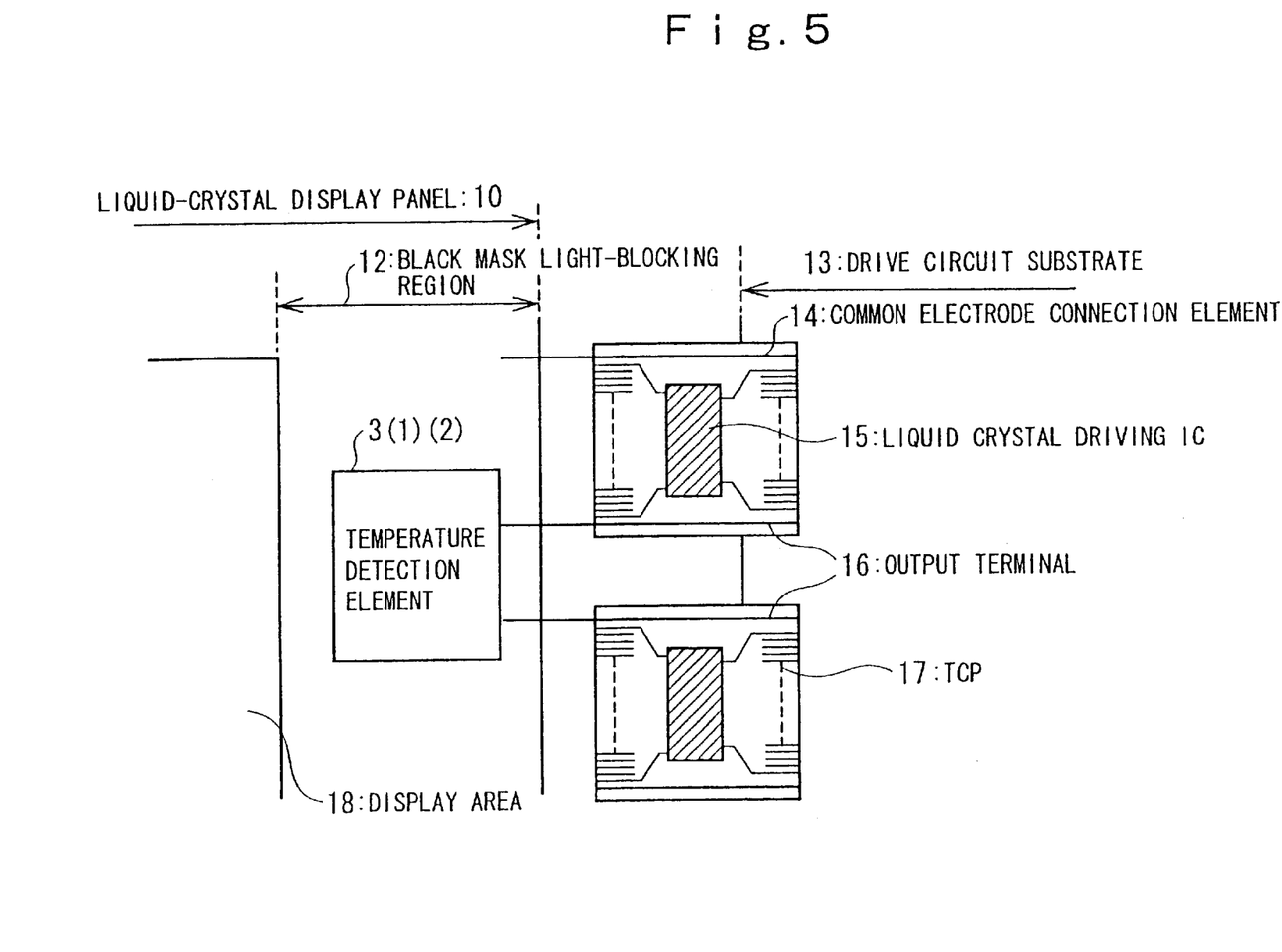
FIG. 5 is a conceptual drawing showing an example of the liquid-crystal display panel according to the present invention.
Figure 6:
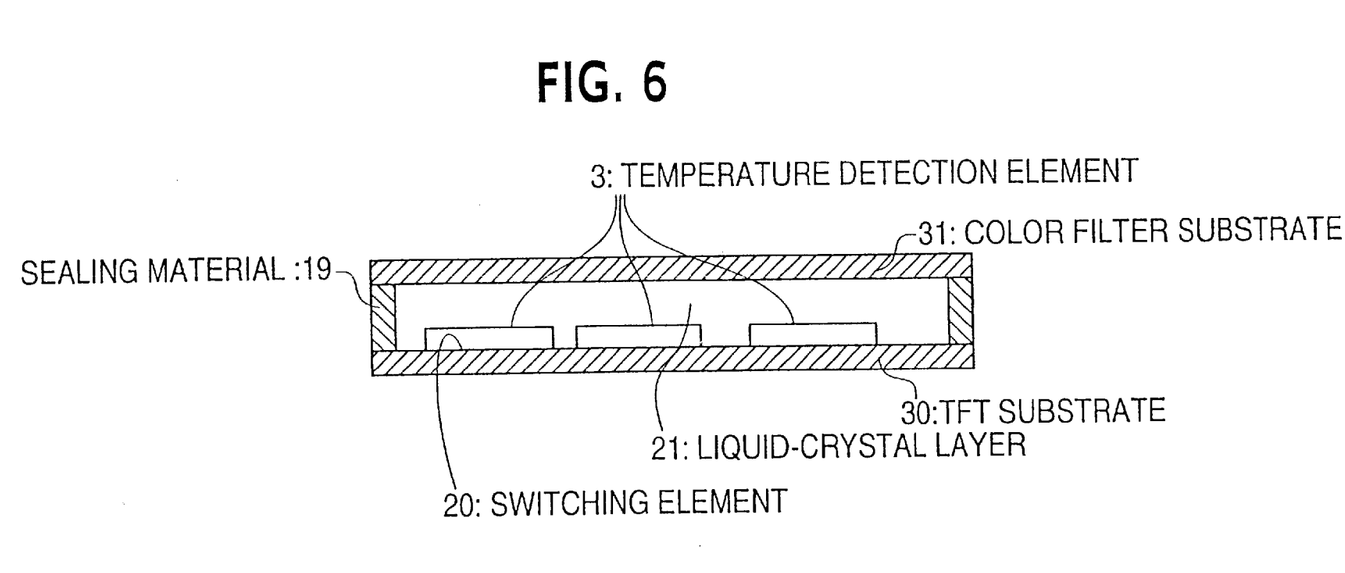
FIG. 6 is a cross-section view showing an example of the liquid-crystal display panel according to the present invention.

First, the overall configuration of a liquid-crystal display according to the present invention will be described. As shown in FIG. 5 and FIG. 6, this embodiment of a liquid-crystal display apparatus includes a liquid-crystal display panel 10, a liquid-crystal driving IC 15 for driving the liquid-crystal display panel 10, and a temperature detection element 3, disposed in a black mask light-blocking region 12 in the liquid-crystal display panel 10 for detecting the temperature of the liquid-crystal layer 21 forming the liquid-crystal display panel 10. The liquid crystal driving IC 15 is mounted, for example, by a TCP (tape carrier package) 17 on the drive circuit substrate 13.

In this embodiment, the liquid-crystal display panel 10 is formed by a TFT substrate 30, a color filter substrate 31, and a liquid-crystal layer 21 that is sealed by a sealing material 19 disposed between the TFT substrate 30 and the color filter substrate 31.

The color filter substrate 31 is made of glass or the like, wherein on a surface in contact with the liquid-crystal layer 31 is formed a transparent electrode or color filter (CF) (not shown in the drawing).

The TFT substrate 30 is made of glass or the like, wherein, on a surface in contact with the liquid-crystal layer 21, thin-film switching transistors (TFTs) of amorphous silicon or the like (not shown in the drawing), transparent scanning lines, signal lines, and pixel electrodes 20 are formed by a known photolithographic process.

Figure 1:
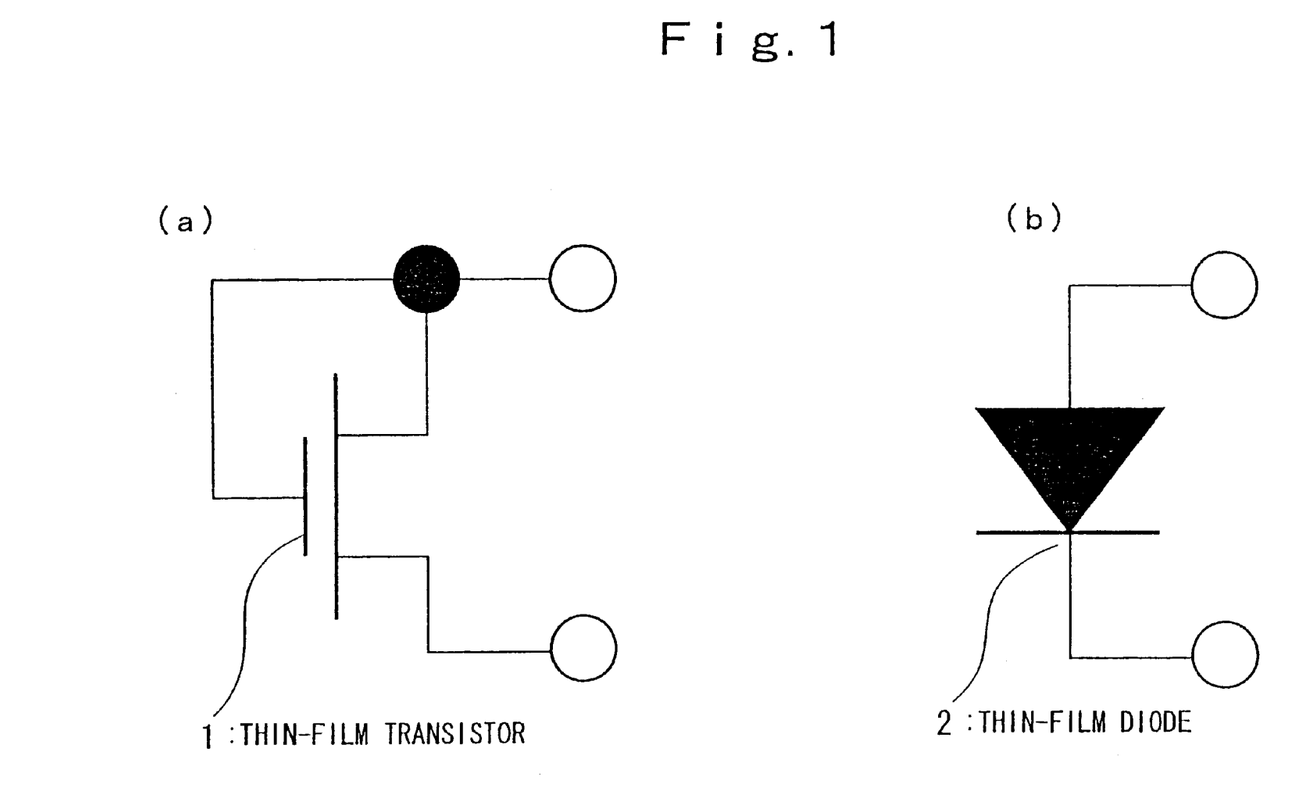
FIG. 1(a) and FIG. 1(b) are thermally sensitive elements according to the present invention.

In this embodiment, in the photolithographic process for forming the thin-film switching transistors, a thin-film transistor 1 or a thin-film diode 2 including a thin-film constant-voltage diode such as shown in FIG. 1, which serves as the temperature detection element 3, are formed simultaneously with the thin-film switching transistors, and the thin-film transistor 1 or thin-film diode 2 is formed on the black mask light-blocking region 12 formed in an outer periphery of a display area 18 of the liquid-crystal display panel 10.

Therefore, the shape and the dimensional accuracy of the temperature detection element 3 are greatly improved in comparison with the prior art, there is absolutely no need for adhering in the process of installing the temperature detection element 3, the number of components and the number of assembly steps for fabricating the liquid-crystal display panel 10 are reduced, and there is both a reduction in the manufacturing cost for the liquid-crystal display panel and an improvement in productivity.

Because the temperature detection element 3 is disposed in the sealed space of the liquid-crystal layer 21 in the liquid-crystal display panel 10, it is possible to directly measure the temperature of interest, which is the temperature of the liquid-crystal layer 21, this being advantageous in terms of temperature detection and the improvement in accuracy thereof.

Figure 2:
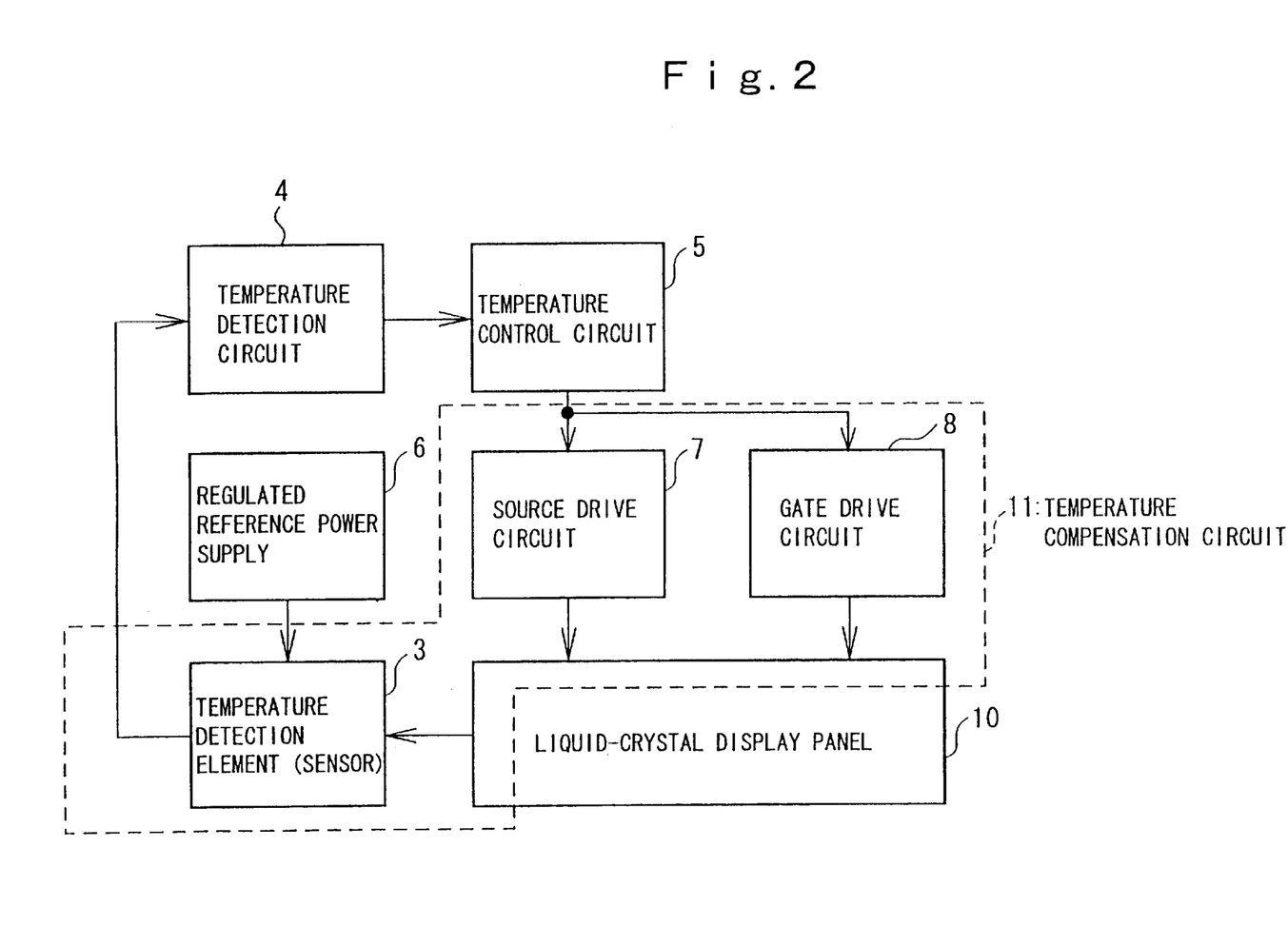
FIG. 2 is a block diagram showing an example of the configuration of temperature compensation circuit in a liquid-crystal display panel according to the present invention.

Referring to FIG. 2, this embodiment of the present invention has a temperature compensation circuit 11 connected to the temperature detection element 3. The configuration of the peripheral circuitry to implement control in accordance with temperature detection by the temperature detection element 3 of the liquid-crystal display panel 10 is as shown in this drawing. By disposing the temperature detection element 3 within the liquid-crystal display panel 10 such as described above, the output of a temperature control circuit 5 for setting the drive voltage of the liquid-crystal layer 21 in accordance with the temperature detected by the temperature detection element 3 via the temperature detection circuit 4 is transmitted to the source drive circuit 7 and the gate drive circuit 8 of the liquid crystal driving IC 15.

FIG. 5 shows the structure for connecting the temperature detection element 3 disposed within the liquid-crystal display panel 10 to the source drive circuit 7 and gate drive circuit 8 of the liquid crystal driving IC 15.

In general, the liquid-crystal display panel 10, and the source drive circuit 7 and gate drive circuit 8 of the liquid crystal driving IC 15 are connected via the TCP (taped carrier package) 17.

In this TCP 17, a common electrode connection terminal 14 which serves as a virtual ground for AC drive of the liquid crystal is usually provided at both ends of the liquid crystal driving IC 15. The common electrode connection terminal 14 of the TCP 17 acts to supply the common electrode potential of the drive circuit substrate 13 to the liquid-crystal display panel 10. When this is done, because of the interconnect structure of the liquid-crystal display panel 10, only several common electrode connection terminals 14 are used as connection terminals of the liquid-crystal display panel 10. The unused common electrode connection terminals 14 are used as output terminals 16 of the temperature detection element 3. Thus, in this embodiment, by using unused common electrode connection terminals 14 as external connection terminals for the temperature detection element 3 in the liquid-crystal display panel 10, it is possible to connect the temperature detection circuit 4 disposed within the drive circuit substrate 13 to the temperature detection element 3.

The operation of this embodiment of a liquid-crystal display is as follows. First, the operation of the circuit of FIG. 2 will be described, with reference being made to FIG. 3, FIG. 4 and FIG. 8.

Figure 4:
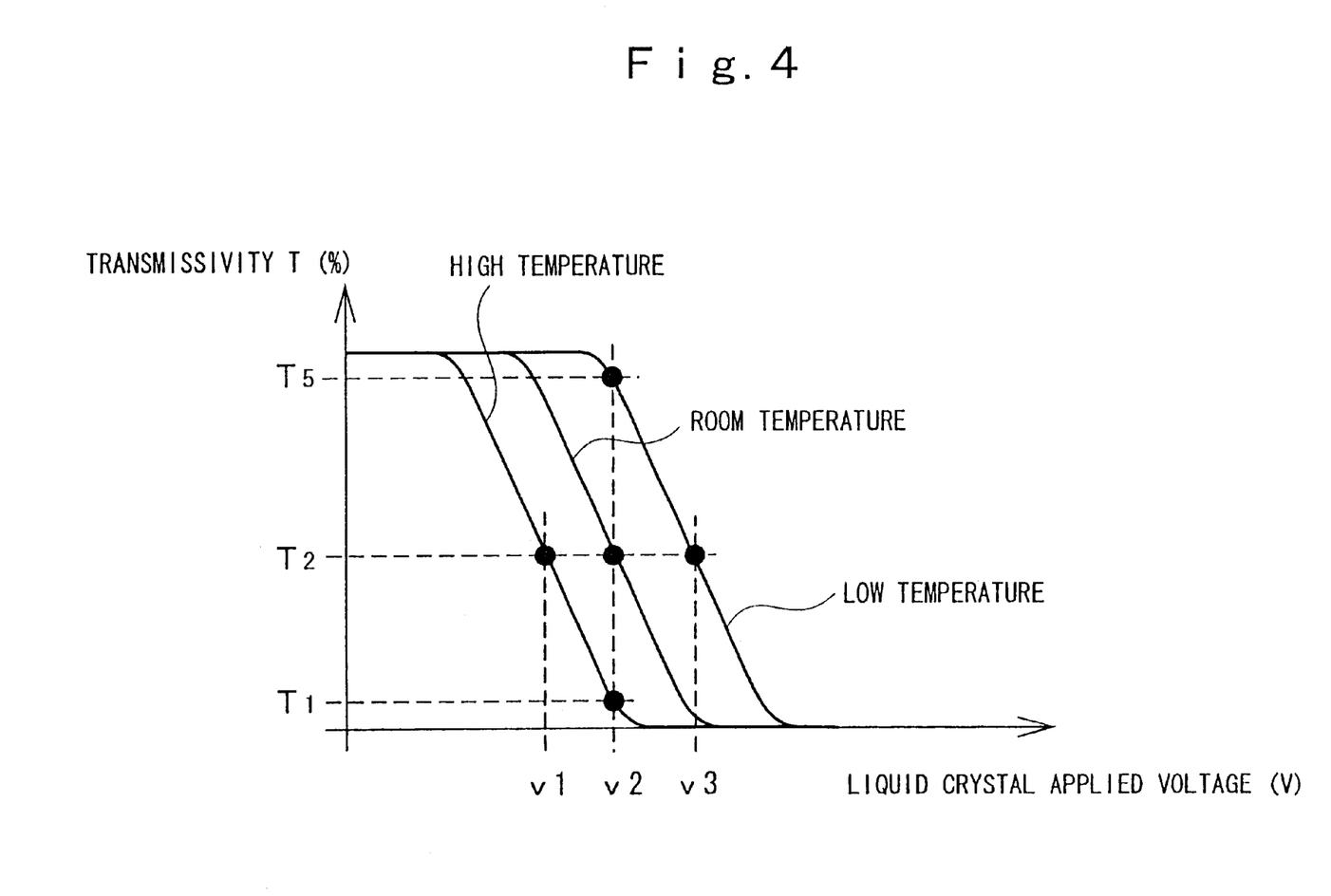
FIG. 4 is a graph showing an example of the liquid crystal drive voltage V versus liquid crystal transmissivity T characteristics in a liquid-crystal display panel according to the present invention.

FIG. 4 shows the relationship between the liquid crystal driving voltage and the normalized liquid crystal transmissivity T (%). As shown in FIG. 4, to obtain the same transmissivity, when the temperature of liquid crystal layer becomes high in comparison with room temperature, it is necessary to reduce the liquid crystal driving voltage. On the other hand, when the temperature of liquid crystal layer becomes low in comparison with room temperature, it is necessary to raise the liquid crystal driving voltage.

The characteristics shown in FIG. 4 exhibits the physical properties of the liquid-crystal material that is sealed in the liquid-crystal layer 21 of the liquid-crystal display panel 10, and this indicates that the drive voltage changes in accordance with the operating temperature of the liquid-crystal display panel 10. In recent years, because there has been a tendency to widen the range of operating temperature for a liquid-crystal display panel 10, there is a need to perform appropriate control of the liquid crystal drive conditions so to stabilize the optical characteristics with respect to a change in the environmental temperature. Therefore, in order to detect the temperature of the liquid-crystal layer 21 and achieve optimal control of the drive voltage in accordance with the temperature change, as described above, a temperature detection element 3 is provided inside the liquid-crystal display panel 10.

Figure 3:
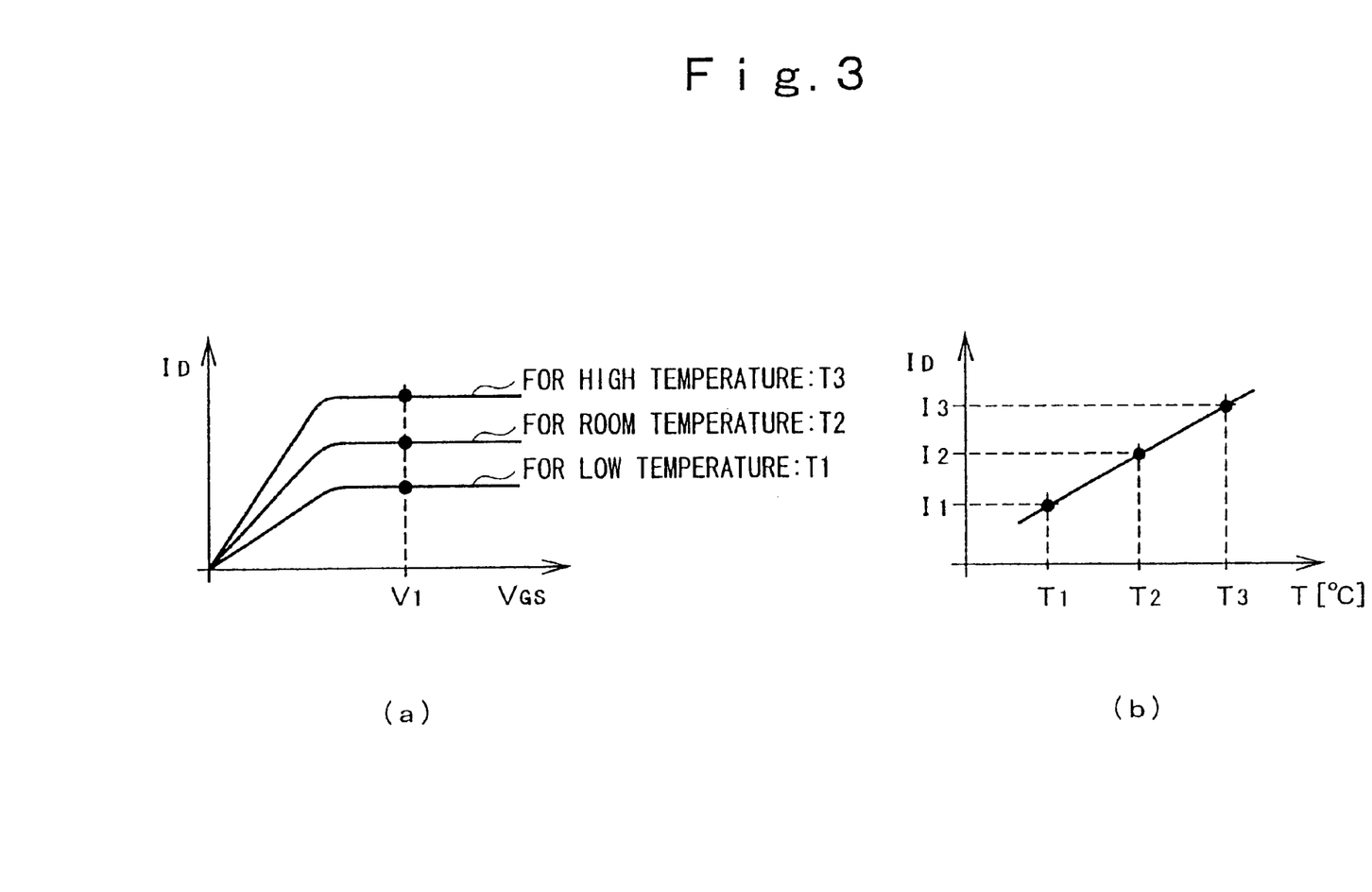
FIG. 3(a) and FIG. 3(b) are graphs showing an example of the dependency on temperature of temperature detection element in a liquid-crystal display panel according to the present invention.

FIG. 3 shows the characteristics of a temperature detection element 3 according to this embodiment, which is provided inside the liquid-crystal display panel 10.

The temperature detection element 3 is a thin-film transistor (TFT) formed on the TFT substrate 30 shown in FIG. 1(*a*), or a thin film diode such as shown in FIG. 1(*b*) or a semiconductor made from a metal other than an amorphous metal. Taking the example of the thin-film transistor of FIG. 1(*a*), the operation is as follows. Specifically, as shown in FIG. 3(*a*), for the same VGS (source-to-gate voltage), when the temperature varies between T1 and T3, there is a change in the current ID flowing between the source and the drain. That is, as shown in FIG. 3(*b*), from the change in the current ID with a constant VGS, it is possible to accurately detect the temperature of the TFT used as a temperature detection element 3, this being the temperature of the liquid-crystal layer 21.

Figure 7:
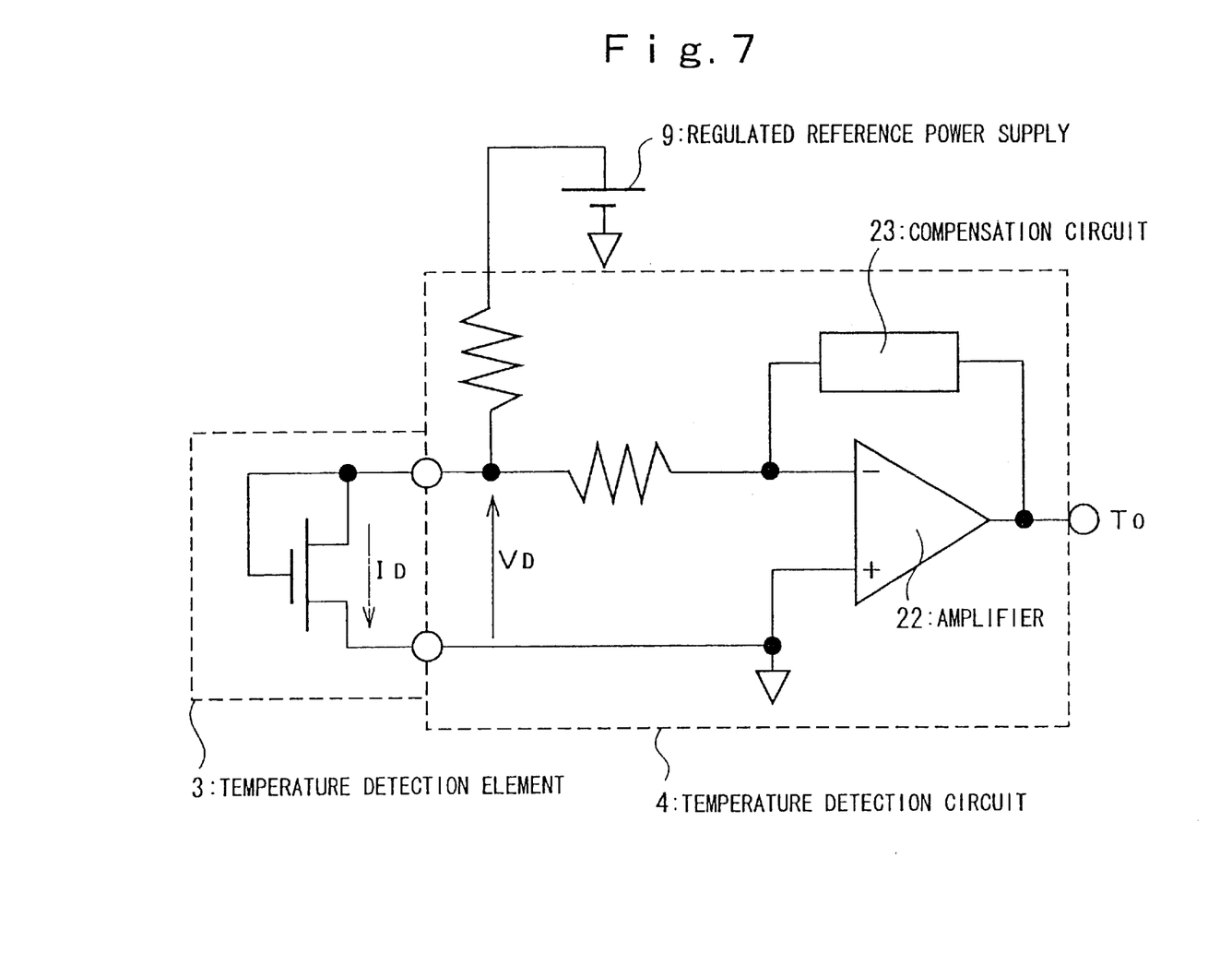
FIG. 7 is a circuit diagram showing an example of the configuration of a temperature detection circuit including a temperature detection element in a liquid-crystal display panel according to the present invention.

The combination of the TFT of FIG. 1(*a*) and the temperature detection circuit 4 is shown in FIG. 7. In this example, a regulated reference power supply 9 is coupled to the gate and drain electrodes of the temperature detection element 3, a drain current ID (t) in response to the temperature flows as shown in FIG. 3(*b*), the result being that a voltage is generated across the terminals of the temperature detection element 3 of FIG. 7. In FIG. 7, the voltage generated from the temperature detection element 3 is phase compensated by the compensation circuit 23 of the temperature detection circuit 4, thereby producing an output signal from which noise has been removed, this being transmitted to the temperature control circuit 5 shown in FIG. 2. The temperature control circuit 5 has a first stage that detects a temperature band by a voltage comparator such as a hysteresis comparator or window comparator, with the next stages selecting a drive voltage for the temperature detected by the above-noted circuit, this being supplied to the source drive circuit 7 and the gate drive circuit 8, so as to provide this voltage to the liquid crystal driving IC 15, thereby supplying an appropriate drive voltage in response to the temperature change of the liquid-crystal layer 21 within the operating temperature range of the liquid-crystal display panel 10.

The temperature detection element 3 is not restricted to only one provided inside the liquid-crystal display panel 10 as described above, and a plurality of the temperature detection element 3 can be provided.

In another embodiment, it is possible to average the outputs of a plurality of temperature detection elements 3, using a voltage averaging circuit, the output of which is output to the temperature control circuit 5 in FIG. 2.

It is also possible to employ a method whereby, of the detected temperatures, the maximum, or minimum, or central temperature is selected.

In another variation, it is possible to employ a method whereby a plurality of detected temperatures are digitally converted, a temperate band in which multiple occurrences of the same temperature exist being taken as the temperature.

A first effect achieved by the present invention configured as in the above-noted embodiments, is to reduce the number of components in the liquid-crystal display panel. The reason for this is that the temperature detection element 3 is integrally formed within the liquid-crystal display panel 10 using the manufacturing process for the liquid-crystal display panel 10, and existing unused terminals are employed to make connections to an external control circuit.

The second effect achieved by the present invention is that there is no need to provide an escape in the mechanical structure of the panel because the structure is flat with no protrusions toward the outside, so that there is no need to have special components to provide this escape.

The third effect achieved by the present invention is to accurately detect the temperature of the liquid-crystal layer 21. The reason for that is that, a thin-film transistor 1 or a thin-film diode 2 such as shown in FIG. 1, which serves as the temperature detection element 3, are formed simultaneously with the thin-film transistors and the like on a part of the TFT substrate 30, the fixing of the temperature detection element 3 is achieved not by an artificial means such as adhesion, but by the exposure accuracy of a photolithographic process, thereby enabling accurate detection of the temperature of the liquid-crystal layer 21.

As a result, the number of components and number of assembly steps for the liquid-crystal display panel 10 are reduced, thereby achieving a reduction in the manufacturing cost of the liquid-crystal display. It is also possible to reduce the number of components in the liquid-crystal display panel 10, thereby achieving a liquid-crystal display that is lightweight and compact. It is also possible to simplify the circuitry and mechanical configuration of the liquid-crystal display. By reducing the number of components and number of assembly steps for the liquid-crystal display panel, it is possible to improve the productivity of the liquid-crystal display. By accurately detecting the temperature of the liquid-crystal layer 21 of the liquid-crystal display panel 10 and performing appropriate temperature compensation control, for example, in response to the temperature change, it is possible to improve the display quality.

While the above-noted embodiments of the present invention were described for the case of application to a liquid-crystal display, the present invention is not restricted in this manner, and can be applied to other technical fields as well.

The above-noted quantities, positions, and shapes and the like are only exemplary of embodiments of the present invention, and it will be understood that other quantities, positions, and shapes can be used in embodying the present invention. In the Accompanying drawings, corresponding elements have been assigned the same reference numerals.

By adopting the constitution described in detail above, the present invention achieves the following effects.

By accurately detecting the temperature of the liquid-crystal layer in a liquid-crystal display panel, it achieves proper temperature compensation control, for example, in response to a change in temperature.

The present invention reduces the number of components and number of assembly steps for a liquid-crystal display panel, thereby achieving a liquid-crystal display with a low manufacturing cost.

By reducing the number of components in a liquid-crystal display panel, the present invention achieves a liquid-crystal display that is lightweight and compact.

The present invention further achieves a simplification of the circuitry and mechanical configuration of a liquid-crystal display.

By reducing the number of components and number of assembly steps of the liquid-crystal display panel, the present invention provides an improvement in productivity of the liquid-crystal display.

By accurately detecting the temperature of the liquid-crystal layer in a liquid-crystal display panel, the present invention achieves proper temperature compensation control in response to a temperature change.

What is claimed is:

1. A liquid crystal display comprising:
    a first substrate having formed on a first surface thereof a plurality of scanning lines and a plurality of signal lines disposed perpendicularly to the scanning lines, and a plurality of pixel electrodes respectively associated with intersections of said scanning lines and signal lines and connected to said signal lines by respective switching elements;
    a second substrate opposed to the first surface of the first substrate;
    a liquid crystal disposed between the first substrate and the second substrate;
    a plurality of temperature detection elements provided on the first surface of the first substrate within a light blocking region at an outer periphery of a display region of the liquid crystal display; and
    a scanning line driving circuit and a signal line driving circuit, each providing drive voltages to the scanning lines and the signal lines, respectively, in accordance with signals from the plurality of temperature detection elements.

2. The liquid crystal display claimed in claim 1, wherein the scanning line driving circuit and signal line driving circuit provide respective driving voltages in accordance with an average of outputs of the temperature detection elements.

3. The liquid crystal display claimed in claim 1, wherein the scanning line driving circuit and signal line driving circuit provide respective driving voltages in accordance with a selected one of outputs of the temperature detection elements.

4. The liquid crystal display claimed in claim 1, wherein the scanning line driving circuit and signal line driving circuit provide respective driving voltages in accordance with a range within which more than one of outputs of the temperature detection elements occurs.

5. The liquid crystal display claimed in claim 1, further comprising:
    a temperature detection circuit coupled to said plurality of temperature detection elements; and
    a temperature control circuit receiving an output signal of the temperature detection circuit and providing output signals to the scanning line driving circuit and signal line driving circuit for setting respective drive voltages thereof.

6. The liquid crystal display claimed in claim 1, wherein the switching elements comprise thin film transistors, and wherein the temperature detection elements comprise thin film transistors.

7. The liquid crystal display claimed in claim 1, wherein the switching elements comprise thin film transistors, and wherein the temperature detection elements comprise one of thin film diodes and thin film constant voltage diodes.

8. The liquid crystal display claimed in claim 1, wherein a semiconductor layer of the switching elements and a semiconductor layer of the temperature detection elements comprise amorphous silicon.

9. The liquid crystal display claimed in claim 1 wherein the signal line driving circuit is provided on a tape carrier package and wherein output terminals of the temperature detection elements are coupled to wirings on the tape carrier package.

* * * * *